United States Patent
Chaney

(10) Patent No.: US 11,010,268 B1
(45) Date of Patent: May 18, 2021

(54) EMBEDDED TIMED ATTESTATION PROCESS

(71) Applicant: Government of the United States, as represented by the Secretary of the Air Force, Wright-Patterson AFB, OH (US)

(72) Inventor: Richard R Chaney, Tipp City, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 21 days.

(21) Appl. No.: 16/385,697

(22) Filed: Apr. 16, 2019

Related U.S. Application Data

(63) Continuation-in-part of application No. 15/441,675, filed on Feb. 24, 2017, now Pat. No. 10,546,130.

(51) Int. Cl.
G06F 11/27 (2006.01)
G06F 21/70 (2013.01)

(52) U.S. Cl.
CPC .............. *G06F 11/27* (2013.01); *G06F 21/70* (2013.01)

(58) Field of Classification Search
CPC .................................. G06F 11/27; G06F 21/70
USPC ......................................................... 726/23
See application file for complete search history.

(56) References Cited

U.S. PATENT DOCUMENTS

| | | | |
|---|---|---|---|
| 7,840,763 B2 | 11/2010 | Murotake et al. | |
| 2010/0333072 A1 | 12/2010 | Dulip et al. | |
| 2017/0352027 A1* | 12/2017 | Zhang | H04L 9/0825 |
| 2018/0034793 A1* | 2/2018 | Kibalo | G06F 21/575 |

FOREIGN PATENT DOCUMENTS

| | | |
|---|---|---|
| WO | 2012123400 A1 | 9/2012 |
| WO | 2016181152 A1 | 11/2016 |

OTHER PUBLICATIONS

Reber, et al "Evaluating System on a Chip Design Security," Journal of Information Warfare, 16(3), pp. 63-78, Apr. 2017.
Yee et al. "Secure coprocessors in electronic commerce applications," USENIX Workshop on Electronic Commerce, 1995.
Reber; "A Comprehensive Security Analysis of and an Implementation Framework for Embedded Software Attestation Methods Leveraging FPGA-Based System-On-A-Chip Architectures," Graduate School of Engineering and Management, Air Force Institute of Technology; pp. 1-112, Mar. 2017.
Seshardri, et all "SWATT: SoftWare-based ATTestation for Embedded Devices," Proceedings of the 2004 IEEE Symposium on Security and Privacy, pp. 1-11, May 12, 2004.
Steiner, et al. "Attestation in Wireless Sensor Networks: a Survey," ACM Computing Surveys, vol. V, No. N, Article A, Jan. 2015.
Trusted Computing Group. TPM main part 1—design principles, specification version 1.2, revision 94, Mar. 2006.
Tygar et al. "A system for using physically secure coprocessors," IP Workshop Proceedings, 1994.

* cited by examiner

*Primary Examiner* — Jacob Lipman
(74) *Attorney, Agent, or Firm* — AFMCLO/JAZ; Jeffrey R. Moore

(57) ABSTRACT

A client with a processor having at least one core and a client timer, and an ETAP module comprising an ETAP high resolution timer, wherein the client processor is programed to use the ETAP timer instead of the client timer to perform timed attestation and produce test results.

14 Claims, 5 Drawing Sheets

EMBEDDED TIMED ATTESTATION PROCESS

RELATED APPLICATIONS

This application is a continuation-in-part of U.S. application Ser. No. 15/441,675, entitled "TIMED ATTESTATION PROCESS" filed on Feb. 24, 2017, the entirety of which is incorporated herein by reference.

GOVERNMENT RIGHTS STATEMENT

The invention described herein may be manufactured and used by or for the Government of the United States for all governmental purposes without the payment of any royalty.

FIELD OF THE INVENTION

This invention relates to the field of cyber security. More particularly, this invention relates to detecting and repairing the damage caused by cyber attacks.

BACKGROUND OF THE INVENTION

In the world of cyber security, the process of determining whether a computing system—referred to as the client—has been compromised by a third party is called attestation. Attestation routines are typically initiated by an external computing system—referred to as the verifier. Various routines are sent to the client by the verifier, which routines are then run on the client, the results of which are then reported back by the client to the verifier. The verifier checks the results that are reported to it against prior, known-good results, and reports the client as either approved or failed.

As a part of the attestation process, software stored in memory is checked to ensure that it has not been changed, memory blocks that are supposed to be empty are checked to ensure that they don't contain any information that isn't supposed to be there, and hardware is checked to ensure that it is functioning in the desired manner. When these attestation tests are successfully completed, then it is assumed that the system has not been compromised.

However, some security exploits can mimic the proper operation and configuration of the client, and thus cannot be detected by art prior attestation routines.

Further, such attestation processes require the use of at least one core of the processor of the client, and thus interfere with the intended operation of the client.

Finally, even when a prior art attestation routine finds a problem with memory blocks that have been altered, they do not have the ability to correct the memory blocks.

What is needed, therefore, is an attestation system that tends to reduce issues such as those described above, at least in part.

SUMMARY OF THE INVENTION

The above and other needs are met by a client with a processor having at least one core and a client timer, and an ETAP module (synonymous with the reference of simply ETAP 40) comprising an ETAP high resolution timer, wherein the client processor is programed to use the ETAP timer instead of the client timer to perform timed attestation and produce test results.

Thus, the embodiments described herein add a further level of security by adding an embedding system within the client, which embedded system can act autonomously from either the verifier or the client, and which can run attestation on the client. This embedded system is referred to as the embedded timed attestation process (ETAP) module.

The ETAP module can be implemented as a system on a chip, and includes (1) a processing device such as a field programmable gate array (FPGA), (2) high resolution timers (defined as timers that are more accurate (closer to the true value) than the timers already present in the client), and (3) a memory that contains (a) a shadow copy of the operating system for the client, (b) attestation routines, (c) instructions in regard to its own operation, and (d) information in regard to the configuration of the client system.

In various embodiments according to this aspect of the invention, the client is embedded in at least one of an aircraft avionics system, a cell phone, a home security system, an alarm system, an automated teller machine, an automobile, a traffic light, an industrial control system, a medical device, a transportation control system, a research and development system, a ground-based radar system, and a satellite system. In some embodiments, the ETAP module includes an ETAP processor. In some embodiments, the ETAP module is an FPGA.

In some embodiments, the ETAP module includes an ETAP memory having sixth blocks containing standardized results, and the client processor compares the test results to the standardized results. In some embodiments, the ETAP module includes an ETAP memory having fourth blocks of memory containing ETAP attestation instructions. In some embodiments, the ETAP module includes an ETAP processor and an ETAP memory, the ETAP memory having fourth blocks of memory containing ETAP attestation instructions. In some embodiments, the ETAP processor autonomously performs timed attestation on the client using the ETAP attestation instructions and the ETAP timer.

According to another aspect of the invention, there is described a client with a processor having at least one core, and an ETAP module with an ETAP high resolution timer, and an ETAP memory for storing data. The ETAP memory has fourth blocks that contain attestation instructions. An ETAP processor autonomously performs timed attestation on the client using the ETAP timer according to the instructions in the fourth blocks of the ETAP memory, including sending attestation instructions to each core of the client processor and receiving test results.

In some embodiments according to this aspect of the invention, the client is embedded in at least one of an aircraft avionics system, a cell phone, a home security system, an alarm system, an automated teller machine, an automobile, a traffic light, an industrial control system, a medical device, a transportation control system, a research and development system, a ground-based radar system, and a satellite system. In some embodiments, the ETAP processor is an FPGA. In some embodiments, the ETAP memory has sixth blocks that contain standardized results, and the ETAP processor is programmed to compare the test results to the standardized results.

In some embodiments, the client includes a client memory with first blocks that contain substantially non-changing data, second blocks that contain substantially changing data, and third blocks available for data. In one embodiment the third blocks may contain substantially no data. Substantially no data is defined as from zero (0) data to 10% of the non-changing data, E.g. minimal data (if any) as needed to perform its intended function. In some embodiments, the ETAP memory includes fifth blocks that contain data substantially similar to the substantially non-changing data in the first blocks of the client memory In some embodiments, the ETAP processor performs attestation on the client, including checking the first blocks of the client memory against the fifth blocks of the ETAP memory, and when they differ, replacing the data in the first blocks of the client memory with the data in the fifth blocks of the ETAP memory.

According to yet another aspect of the invention there is described a client having a client memory for storing data, with first blocks that contain substantially non-changing data, second blocks that contain substantially changing data, and third blocks that are available for data. In one embodiment the third blocks may contain substantially no data. A client processor with at least one core, for performing instructions that are contained in the first blocks of the client memory. An ETAP module with an ETAP high resolution timer, and an ETAP memory for storing data. The ETAP memory has fifth blocks that contain data substantially similar to the substantially non-changing data in the first blocks of the client memory. An ETAP processor performs attestation on the client, including checking the first blocks of the client memory against the fifth blocks of the ETAP memory, and when they differ, replacing the data in the first blocks of the client memory with the data in the fifth blocks of the ETAP memory.

In some embodiments according to this aspect of the invention, the client is embedded in at least one of an aircraft avionics system, a cell phone, a home security system, an alarm system, an automated teller machine, an automobile, a traffic light, an industrial control system, a medical device, a transportation control system, a research and development system, a ground-based radar system, and a satellite system. In some embodiments, the ETAP processor is an FPGA. In some embodiments, the ETAP processor checks the third blocks of memory, and when the third blocks of memory contain found data, it erases the found data from the third blocks of memory. Found data describes areas of memory which are supposed to be blank. Memory blocks that are supposed to be empty are checked to ensure that they don't contain any information that isn't supposed to be there.

In some embodiments, the ETAP module performs timed attestation on the client autonomously. In some embodiments, the timed attestation performed on the client by the ETAP process includes sending attestation instructions to each core of the client processor and receiving results. In some embodiments, the ETAP memory also includes sixth blocks containing standardized results, and the ETAP processor compares the test results to the standardized results. Some embodiments include an output for reporting the comparison of the test results to the standardized results.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION OF THE INVENTION

Figure 1:
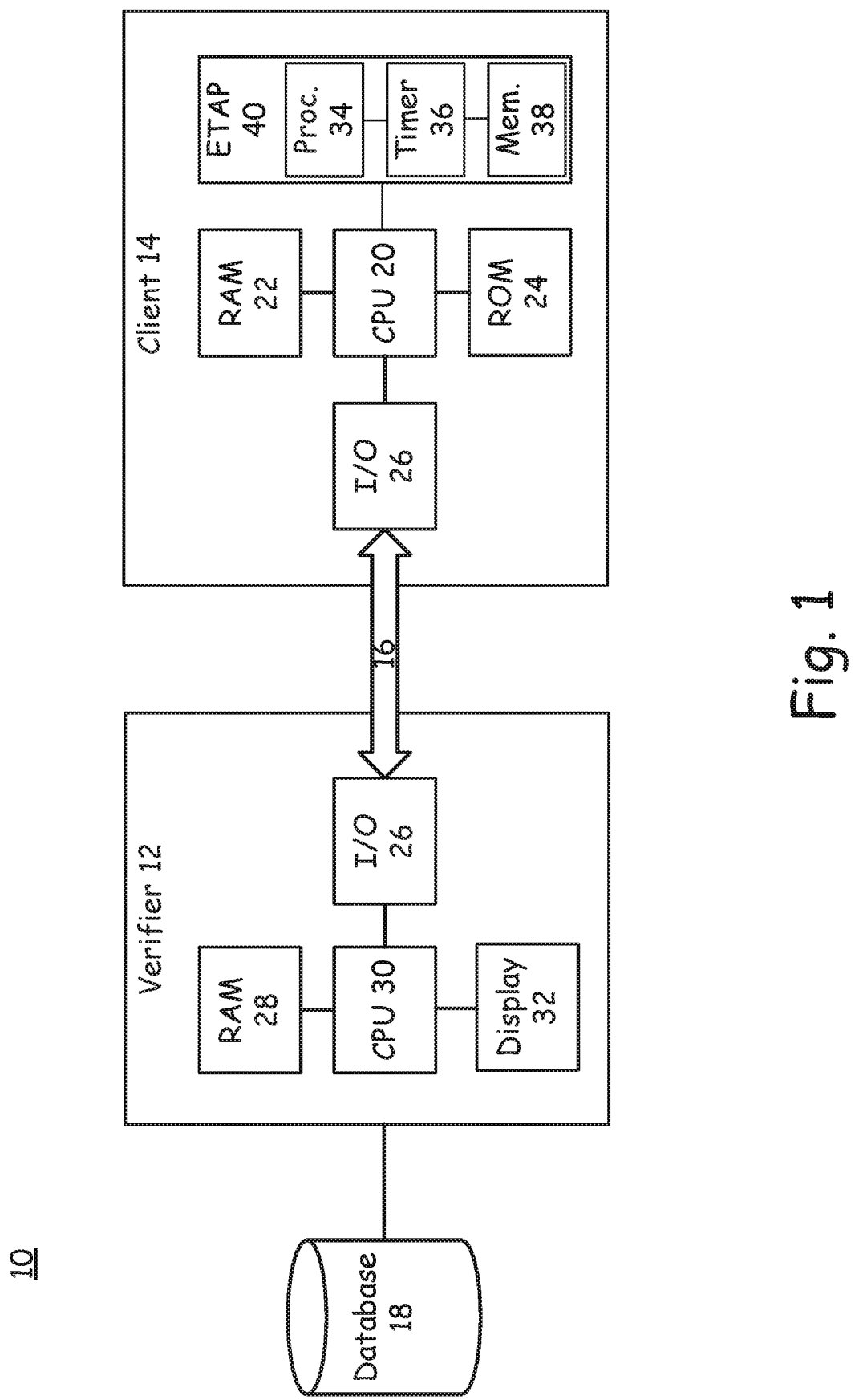
FIG. 1 is a functional block diagram of an attestation system according to an embodiment of the present invention.

With reference now to FIG. 1 there is depicted a functional block diagram of a system 10 according to an embodiment of the present invention. The computing system to be checked for integrity—or in other words, on which attestation is to be performed—is the client computing device 14, which is referred to as the client 14 herein. Some embodiments use an external verifier computing device 12, which is referred to as the verifier 12 herein. Finally, there is in some embodiments a database 18 of historical and baseline data, which the verifier 12 can access to both store new data and retrieve old data.

The verifier 12 includes, in some embodiments, random access memory 28, processor 30, display 32, and input/output 26, through which it communicates with the client 14, such as through data transport layer 16 and the input/output 26 residing in the client 14. The client 14 also includes, in some embodiments, random access memory 22, processor 20, read only memory 24, and the embedded timed attestation process (ETAP) 40, which includes a processor 34, timers 36, and a memory 38. The ETAP 40, in some embodiments, comprises a field programmable gate array.

The verifier 12 may be a personal computer, such as a laptop computer, desktop computer, or tablet computer. Alternately, the verifier 12 may be a customized computer configured to be dedicated to the performance of the attestation process on various clients 14. In some embodiments the verifier 12 is a handheld computing device, such as a smartphone.

The client 14 may be an embedded computing device, such as may be employed in an avionics line replaceable unit used for aircraft navigation, communication, or control.

In other exemplary and nonlimiting embodiments, the client 14 may be an embedded computing device in a cell phone, home security system, alarm system, automated teller machine, automobile, traffic light, industrial control system, piece of medical equipment, ground-based radar system, or satellite system.

In various embodiments, the transport layer 16 is one or more of an Ethernet network, a MIL-STD-01553 data bus, an RS-232 data bus, an ARINC 429 data bus, a Wi-Fi network, a Bluetooth link, a controller area network (CAN) bus, and a satellite communications network.

The basic operation of the system 10 is that one or both of the verifier 12 and the ETAP 40 sends function queries to one or more of the cores of the client 14 CPU 20, which the CPU 20 executes. These queries can check various aspects of the client 14, such as the timing of data pathways, the numerical results of computations performed by one or more of the cores of the CPU 20, the existence of extraneous or altered information stored in the RAM 22, and so forth. In some embodiments, the verifier 12 sends commands to the ETAP 40, and the ETAP 40 performs the checks on the other elements of the client 14. In some embodiments, the ETAP 40 initiates the commands of the attestation process autonomously.

In one embodiment, when a given query is sent by either the verifier 12 or the ETAP 40 (the requesting device), a remote timer within the requesting device is started, and when the result is received back by the requesting device, the remote timer is stopped and a remote elapsed time is computed and recorded. Similarly, when the query from the requesting device is received by the client 14, a local timer 36 is started in the ETAP 40, and when the result is sent back to the requesting device, the local timer 36 is stopped, and the local elapsed time is computed and recorded.

Thus, in one embodiment, for each query there are at least three piece of information that are generated, which are the query result, the remote elapsed time (at the requesting device), and the local elapsed time (at the ETAP 40). The local elapsed time is based on the ETAP 40 timers 36 because of the greater accuracy and resolution of the ETAP 40 timers 36 as compared to the timers that might be controlled by the client 14 CPU 20. By checking each of these three pieces of information against baseline information produced on a similar known-good client 14, such as can be stored in at least one of the database 18 or the ETAP Memory 38 of the ETAP 40, the integrity of the client 14 being tested can be determined.

For example, the verifier 12 is in communication with an attestation value database 18 that stores baseline values for query results, local elapsed times, and remote elapsed times for multiple queries that may be performed by various combinations of hardware elements of the client 14. In some embodiments this same information is stored in the ETAP Memory 38 of the ETAP 40. In some embodiments the database 18 is accessible by the ETAP 40, so that this baseline information can be checked directly.

The baseline values for query results and elapsed times stored in the attestation value database 18 (or elsewhere as described herein) can be determined based on the collected query results from multiple executions of each function on a client 14 that is in a known good (trusted) state. These initial executions create a set of baseline values designated as default values for all clients 14 of the same type or configuration. The collected baseline values are analyzed to produce typical values and allowable variances for each query result, local elapsed time, and remote elapsed time.

Baseline values in the database 18 may be updated when another trusted client 14 is tested that is of the same type or configuration as the one used to create the initial default values. In one embodiment, a new database 18 entry is created to identify the new client 14, and the collected results for the new client 14 are automatically re-analyzed to produce a unique set of typical values and allowable variances for each query result, local elapsed time, and remote elapsed time.

Figure 2:
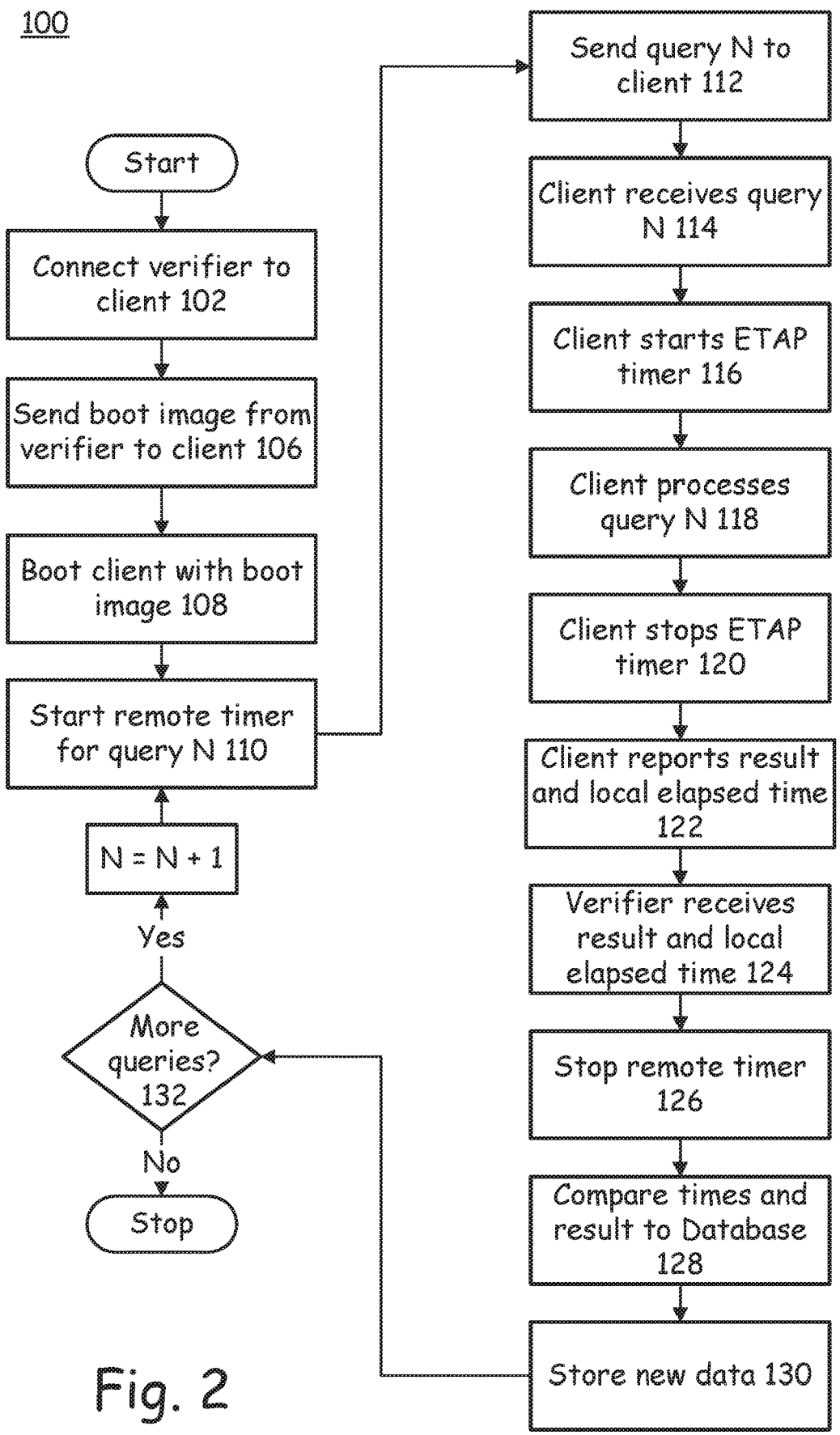
FIG. 2 is a flow-chart for an attestation process according to a first embodiment of the present invention.

With reference now to FIG. 2, there is described an attestation method 100 for verifying the integrity of the client 14 using both the verifier 12 and the ETAP 40. As given in block 102, the verifier 12 is connected to the client 14 via the communication network 16, over which the verifier 12 sends a boot image to the client 14, as given in block 106. Then, as given in block 108, the ETAP 40 causes the client 14 to boot with the clean boot image that has been sent to it by the verifier 12. The purpose of this portion of the method is that the client 14 is in an untrusted state as originally connected-to, and needs to boot from a known boot image in order to ensure that those instructions have not been compromised.

The verifier 12 starts one of its own internal timers as given in block 110, so as to measure the length of time required for the client 14 to complete a first function query N. The verifier 12 will be sending several function queries to the client 14, and measuring the length of time that is required for the client 14 to complete each one of those queries. As previously mentioned, both the results of each query and the length of time required by the client 14 to complete each query are used to determine whether the client 14 has been compromised.

Thus, the attestation process 100 enters a loop that commences with starting the verifier 12 timer in block 110, and sending the $N^{th}$ function query (which in this case is the first function query) to the client 14, as given in block 112. The client receives the $N^{th}$ function query as given in block 114 and starts the ETAP 40 timer 36 as given in block 116. In one embodiment, the ETAP timer 36 has a far greater resolution than the timers that are present in the client 14, and thus provide for a more precise measure of the time required by the client 14 to complete the $N^{th}$ function query, and thereby a more precise measure of the compliance of the client 14.

The client 14 processes the $N^{th}$ function query as given in block 118, and then stops the ETAP 40 timer 36, as given in block 120. The client 14 then sends back to the verifier 12 over the communication network 16 the results of the $N^{th}$ function query and the time to complete the $N^{th}$ function query as measured by the timer 36 in the ETAP 40, as given in block 122. The verifier 12 receives this information, as given in block 124, and stops the remote timer that is resident in the verifier 12, as given in block 126.

The verifier 12, either at this time or after all of the function queries have been reported by the client 14, compares both the $N^{th}$ function query results and the two reported times (the round-trip time represented by the elapsed time of the verifier 12 timer, and the operation time represented by the elapsed time of the ETAP 40 timer 36) to the known-uncompromised values for each of those data points as recorded in the database 18, as given in block 128, and then stores the results of those comparisons in the database 18, as given in block 130.

The method 100 then checks to see whether all of the desired function queries have been executed by the client 14, as given in block 132. If not, then the $N^{th}+1$ function query is selected and enters the routine as described above. If so, then the method 100 is completed.

As a part of the method 100, the comparison of the elapsed times and the results of a given function query is compared to discrepancy limits for that specific set of data. If any one of the times or the result for a given function query violate the tolerance limits set for that specific set of data, then a warning report can be issued and the client 14 can be listed as tentatively compromised, pending further investigation.

Figure 3:
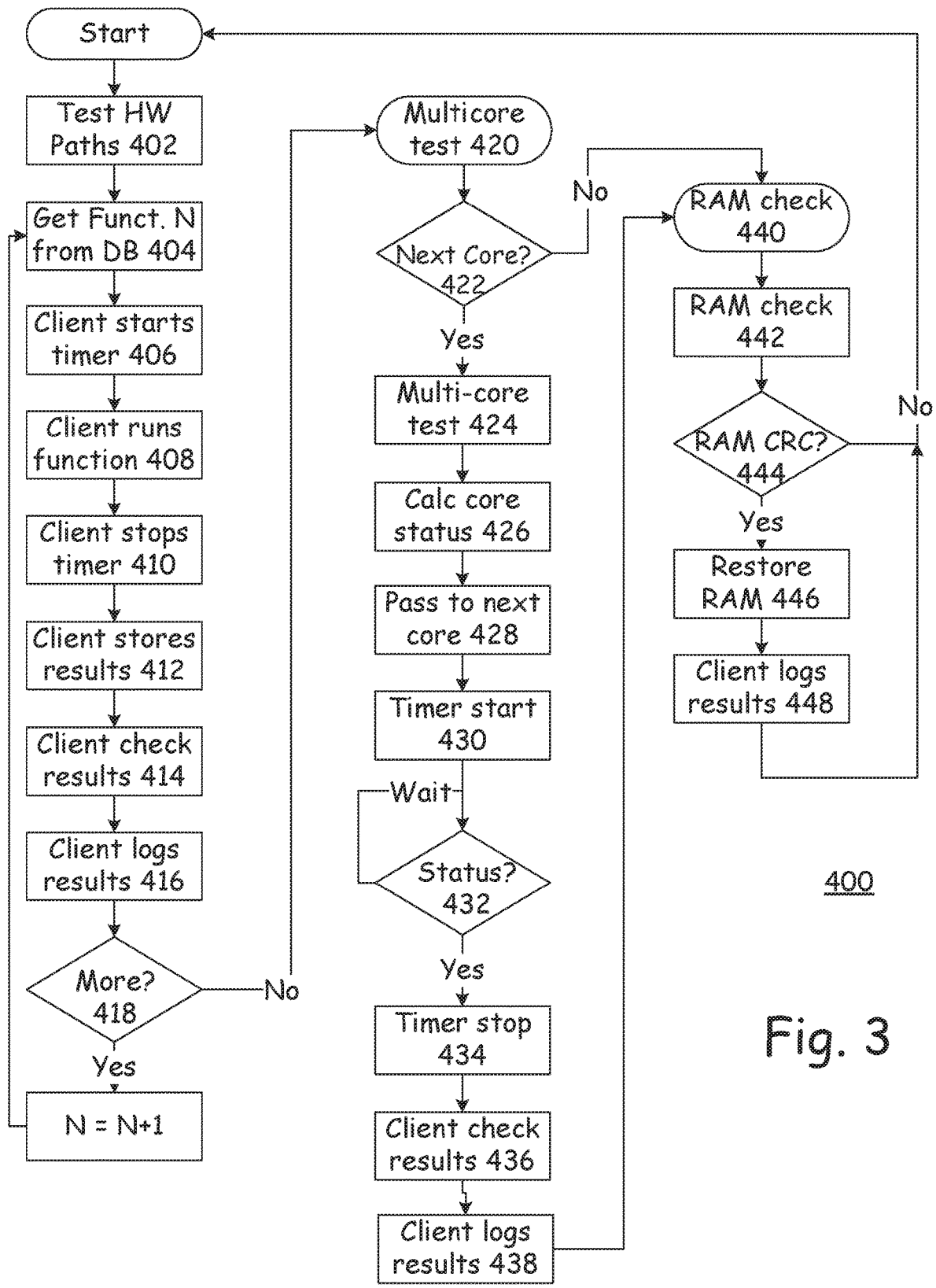
FIG. 3 is a flow-chart for an attestation process according to a second embodiment of the present invention.

With reference now to FIG. 3, there is depicted a flow chart for another embodiment of an attestation method 400, in which the ETAP 40 performs functions that are described in a bit more detail than previously discussed. In this manner, the ETAP 40 can perform attestation on the client 14 somewhat autonomously (reduced reliance on the verifier 12), and without taking the client 14 offline.

In one embodiment of this method 400, one or more of three different attestation processes are run, including testing of the hardware paths of the client 14, testing the cores of the CPU 20 of the client 14, and checking the RAM 22 of the client 14. These three routines are described in more detail below.

The hardware path attestation routine is initiated at block 402. A first function N for testing is selected from a database within the memory 38 of the client 14, as given in block 404. The client 14 starts a timer as given in block 406, which is the ETAP 40 timer 36. The client 14 then runs the selected function as given in block 408. When the selected function is completed, the client 14 stops the timer 36 as given in block 410, and stores the results in the database, as given in block 412. The client 14 then checks the results to the baseline values, such as described above, as given in block 414, and adds the results to a log, as given in block 416. If more queries are to be run as given in decision block 418, then the routine falls back to block 404 and the process continues. If not, then the routine continues with the next portion of the attestation process, which is the multicore test 420.

One purpose of the multicore test routine 420 is to ensure that all of the cores of the CPU are functioning properly (uncompromised), and the primary method by which this is accomplished is by determining the time that it takes for all of the cores to serially complete a query.

The routine starts by determining if there is a remaining core to be tested, as given in block 422. If the routine is just being entered, then all of the cores still need to be tested, and so the routine falls to block 424, where the test is initiated. In block 426 the status of the first core is determined, and then in block 428 the statuses of the following cores are determined. Then the timer is started, as given in block 430, such as the ETAP 40 timer 36. Then the cores are checked in a serial manner, each subsequent core waiting for a status to proceed from a previous core, as given in block 432. Once all of the cores have been checked, the loop exits into block 434, where the timer is stopped.

If the routine is under the control of the client 14, then the client 14 checks the results including the elapses time, against the standard results as contained in a database, such as in the memory 38 of the ETAP 40, as given in block 436. If the routine is under the control of the ETAP 40, then all of the cores of the CPU 20 of the client 14 can be checked, and the ETAP 40 checks the results with the database residing in the memory 38 of the ETAP 40. The client 14 (or the ETAP 40, as appropriate) then logs the results of the testing just completed, such as in the database in the memory 38 of the ETAP 40, as given in block 438.

Another routine is the RAM check routine 440, which is used to check the integrity of the RAM 22 in the client 14. As given in block 442, this test looks at portions of the RAM 22 to ensure that they either contain, or don't contain, the proper information. For example, substantially non-changing portions of the RAM 22, such as might hold operating instructions for the client 14, operating system, and so forth, are checked to ensure that the proper information is written there. Other portions of the RAM 22, such as should generally be empty, are checked to ensure that no information is written there.

This is accomplished by running a test on the data, such as a CRC test, and checking the results of the test for a given block of the RAM 22 against a stored value, such as a value stored in the database in the memory 38 of the ETAP 40. If the test fails, meaning that the RAM 22 does not agree with the stored value as given in block 444, then that portion of the RAM 22 is restored with a shadow copy of what is supposed to be there, which shadow copy, in one embodiment, is stored in the memory 38 of the ETAP 40, as given in block 446. One of the client 14 or the ETAP 40 as appropriate (as discussed above) updates the log in the ETAP module 40, ETAP memory 38 or elsewhere, as given in block 448. When all failures have been resolved, or if there are no failures, then the routine passes back to the start.

Figure 4:
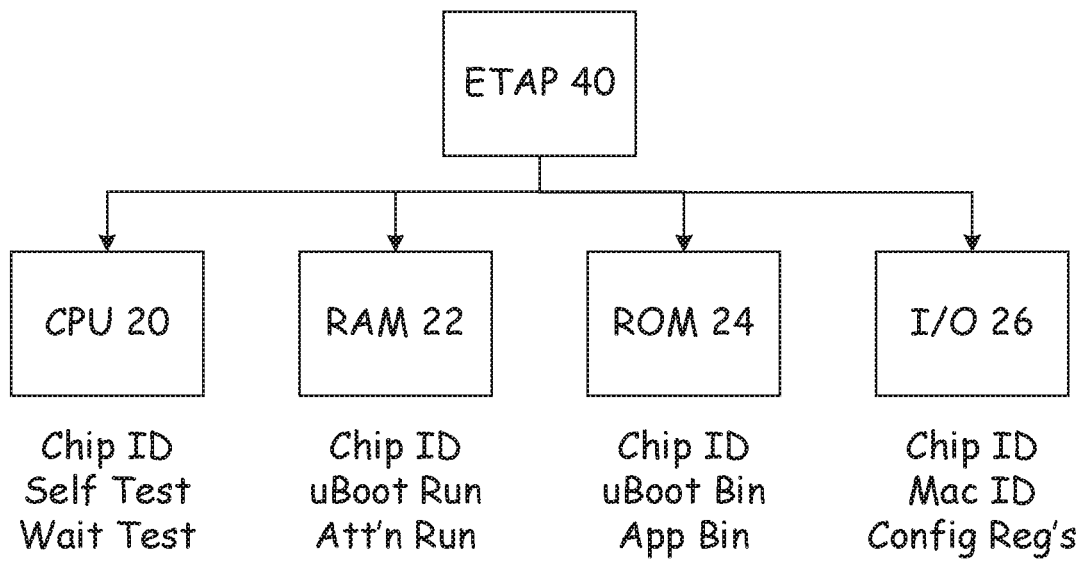
FIG. 4 is a diagrammatic representation of attestation functions performed by an ETAP module according to an embodiment of the present invention.
Figure 5:
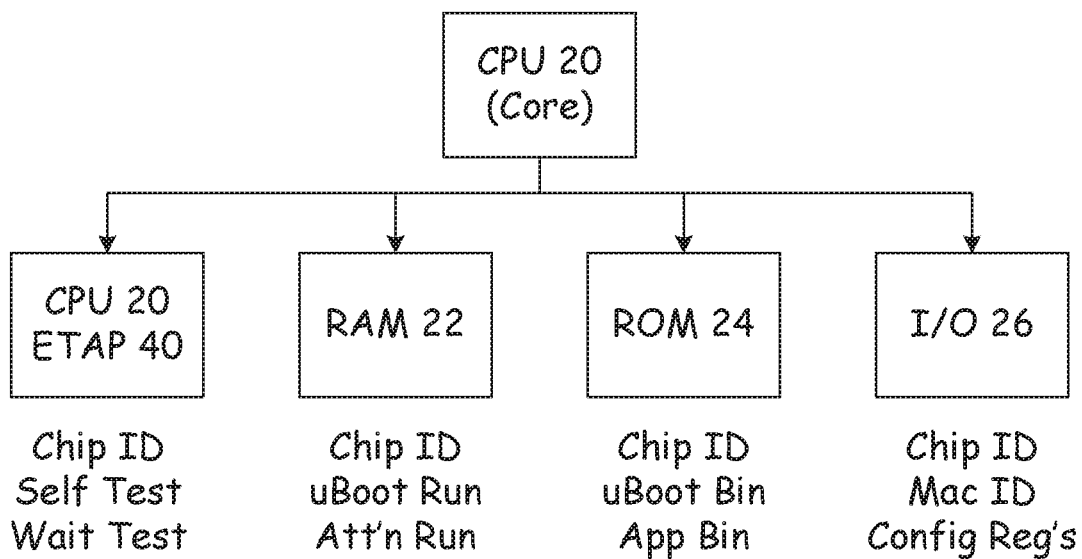
FIG. 5 is a diagrammatic representation of attestation functions performed by a client CPU core according to an embodiment of the present invention.

FIGS. 4 and 5 provide simplified graphical depictions of the testing 400 as previously described. As depicted in FIG. 4, the ETAP 40, in one embodiment, controls testing of aspects of the client 14, including the CPU 20, the RAM 22, the ROM 24, and I/O 26, including identification of component IDs, and various testing routines for each component.

As depicted in FIG. 5, the CPU 20 of the client 14 can also, in some embodiments, control the attestation of components of both the client 14 and portions of the ETAP 40, such as the other cores of the CPU 20 that are not used for the attestation process, the ETAP 40, the RAM 22, the ROM 24, and I/O 26, such as under the direction of the ETAP 40 or the verifier 12.

Figure 6:
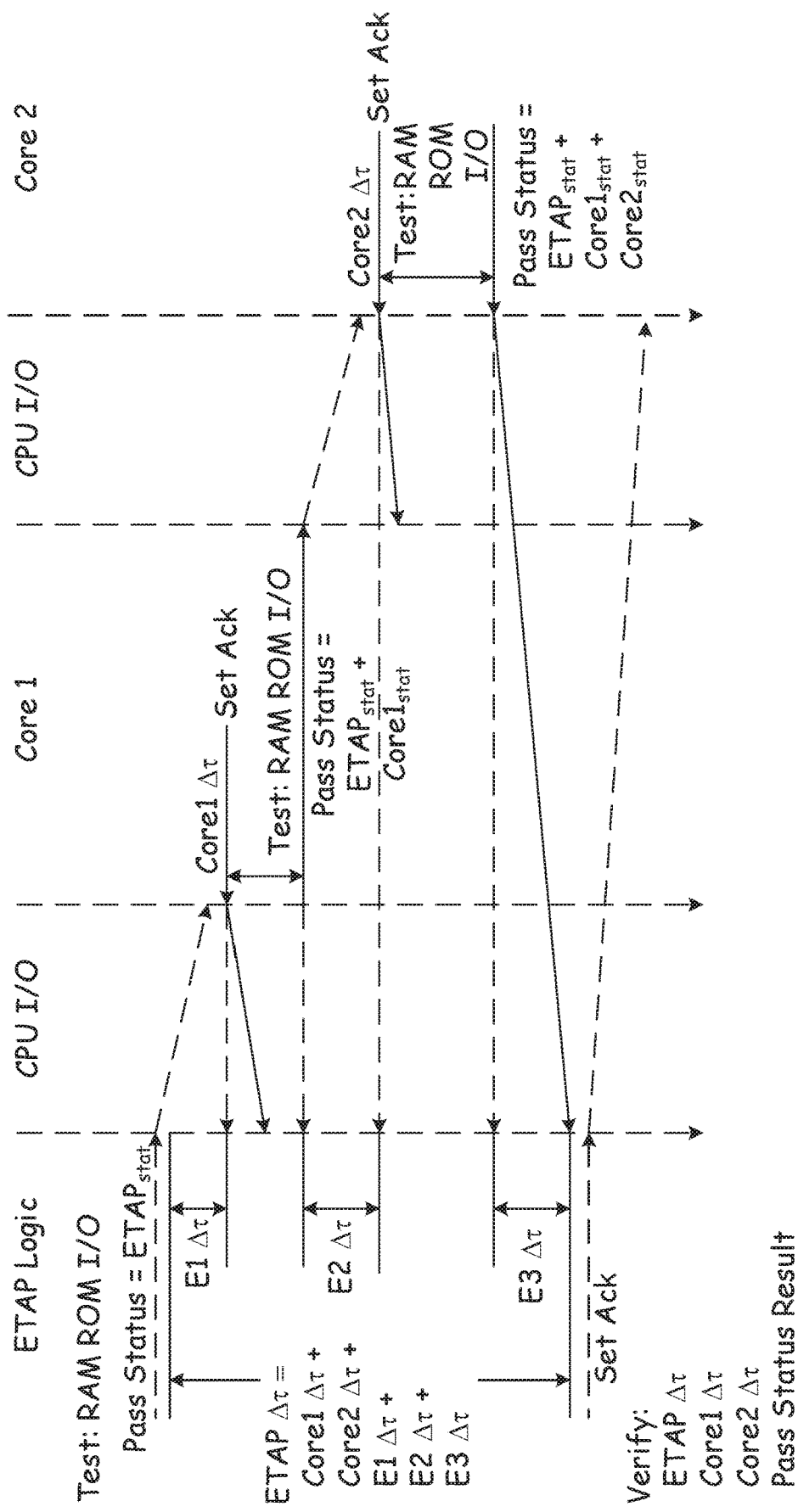
FIG. 6 is a timing diagram of an attestation system according to an embodiment of the present invention.

FIG. 6 provides a visual depiction of the attestation process for an exemplary two-core CPU 20 of a client 14. It is appreciated that these attestation routines can be scaled to any number of cores, and that two cores are depicted solely for the sake of clarity in the diagram of FIG. 6.

Timing is collected for the multicore-response from the ETAP 40, and is designated ETAP $\Delta t$. This ETAP time (ETAP $\Delta t$=Core1 $\Delta t$+Core2 $\Delta t$+E1 $\Delta t$+E2 $\Delta t$+E3 $\Delta t$) includes the interconnect variances of the embedded times (E1 $\Delta t$, E2 $\Delta t$, and E3 $\Delta t$) and ETAP timing registers (Core1 $\Delta t$, Core2 $\Delta t$). These variances allow time for attacks to take place. The ETAP 40 then compares the client value, Client $\Delta t$, and ETAP $\Delta t$ to the expected results. The pass status is passed along and combined with all the other client 14 core 20 statuses. The pass status is a resultant status of all of the tests (RAM 22, ROM 24, I/O) 26 run on a single client 14 core of the CPU 20.

The foregoing description of embodiments for this invention has been presented for purposes of illustration and description. It is not intended to be exhaustive or to limit the invention to the precise form disclosed. Modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

REFERENCE NUMBER INDEX

10 Attestation system
12 Verifier
14 Client
16 Transport layer
18 Database
20 Client CPU
22 Client RAM
24 Client ROM
26 Input/output
28 Verifier RAM
30 Verifier CPU
32 Verifier display
34 ETAP processor
36 ETAP timer
38 ETAP memory
40 ETAP

What is claimed is:
1. A client, comprising:
a client processor having an operating system, at least one core and a client timer, and an embedded timed attestation process (ETAP) module comprising an ETAP high resolution timer, an ETAP processor having an ETAP first memory that contains a shadow copy of the operating system for the client; the memory further including at least one attestation routine and capable of operation and configuration of the client;

wherein the client processor is programed to use the ETAP timer instead of the client timer to perform timed attestation and produce test results; and if timed attestation fails, the operating system is replaced with the shadow copy of the operating system.

2. The client of claim 1, wherein the client is embedded in at least one of an aircraft avionics system, a cell phone, a home security system, an alarm system, an automated teller machine, an automobile, a traffic light, an industrial control system, a medical device, a transportation control system, a research and development system, a ground-based radar system, and a satellite system.

3. The client of claim 1, wherein the ETAP module further comprises an FPGA.

4. The client of claim 1, wherein the ETAP module further comprises at least one second memory block containing standardized results, and the client processor compares the test results to the standardized results.

5. The client of claim 1, wherein the ETAP module further comprises at least one third memory block containing ETAP attestation instructions.

6. The client of claim 5, wherein the ETAP attestation instructions autonomously perform timed attestation on the at least one core using the ETAP timer.

7. A client, comprising:
a client memory for storing data, the client memory having first blocks that contain substantially non-changing data, second blocks that contain substantially changing data, and third blocks available for data,
a client processor having at least one core, the client processor for performing instructions that are contained in the first blocks of the client memory,
an ETAP module comprising,
an ETAP high resolution timer,
an ETAP memory for storing data, the ETAP memory having fifth blocks that contain data substantially similar to the substantially non-changing data in the first blocks of the client memory,
an ETAP processor for performing attestation on the client, the attestation including checking the first blocks of the client memory against the fifth blocks of the ETAP memory, and when they differ, replacing the data in the first blocks of the client memory with the data in the fifth blocks of the ETAP memory.

8. The client of claim 7, wherein the client is embedded in at least one of an aircraft avionics system, a cell phone, a home security system, an alarm system, an automated teller machine, an automobile, a traffic light, an industrial control system, a medical device, a transportation control system, a research and development system, a ground-based radar system, and a satellite system.

9. The client of claim 7, wherein the ETAP processor comprises an FPGA.

10. The client of claim 7, the ETAP processor further for checking the third blocks of memory, and when the third blocks of memory contain a found data, erasing the found data from the third blocks of memory.

11. The client of claim 7, wherein the ETAP module performs timed attestation on the client autonomously.

12. The client of claim 7, wherein the timed attestation performed on the client by the ETAP process includes sending attestation instructions to each core of the client processor and receiving test results.

13. The client of claim 12, wherein the ETAP memory further comprises sixth blocks containing standardized results, and the ETAP processor further compares the test results to the standardized results, providing a comparison.

14. The client of claim 13, further comprising an output for reporting the comparison of the test results to the standardized results.

* * * * *